United States Patent
Cho et al.

(10) Patent No.: US 10,089,920 B2
(45) Date of Patent: Oct. 2, 2018

(54) ROLLABLE DISPLAY DEVICE AND ELECTRONIC DEVICE INCLUDING THE SAME

(71) Applicant: Samsung Display Co., Ltd., Yongin-si (KR)

(72) Inventors: Sung-Yeon Cho, Hwaseong-si (KR); Kwan-Ho Kim, Yongin-si (KR); Jin-Hee Park, Seoul (KR); Ho-Seok Son, Gwangmyeong-si (KR); Jae-Hyung Cho, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/605,814

(22) Filed: May 25, 2017

(65) Prior Publication Data

US 2018/0068612 A1 Mar. 8, 2018

(30) Foreign Application Priority Data

Sep. 8, 2016 (KR) .................. 10-2016-0115378

(51) Int. Cl.
*G09G 3/3208* (2016.01)
(52) U.S. Cl.
CPC ..... *G09G 3/3208* (2013.01); *G09G 2330/021* (2013.01); *G09G 2380/02* (2013.01)

(58) Field of Classification Search
CPC ......... G06F 1/1652; G06F 2203/04102; G09F 9/301; H04M 1/0268; G09G 2380/02; H01L 2251/5338
See application file for complete search history.

(56) References Cited

U.S. PATENT DOCUMENTS 8,232,987 B2 7/2012 Park et al.
2010/0149162 A1* 6/2010 Park ..................... G09G 3/2007
345/212
2014/0306985 A1* 10/2014 Jeong ................... G09G 3/3233
345/601

FOREIGN PATENT DOCUMENTS

KR 10-2010-0068075 6/2010

* cited by examiner

*Primary Examiner* — Koosha Sharifi-Tafreshi
(74) *Attorney, Agent, or Firm* — H.C. Park & Associates, PLC

(57) ABSTRACT

A rollable display device including a rollable display panel including a plurality of pixels each having an organic light emitting element, a panel driving circuit configured to drive the rollable display panel, a power supplying circuit configured to supply a high power voltage and a low power voltage to the rollable display panel, such that the organic light emitting element emits light based on the high power voltage and the low power voltage, and an ohmic drop compensation margin changing circuit configured to sense a degree that the rollable display panel is unrolled and change an ohmic drop compensation margin of the low power voltage to compensate ohmic drops based on the degree that the rollable display panel is unrolled.

20 Claims, 9 Drawing Sheets

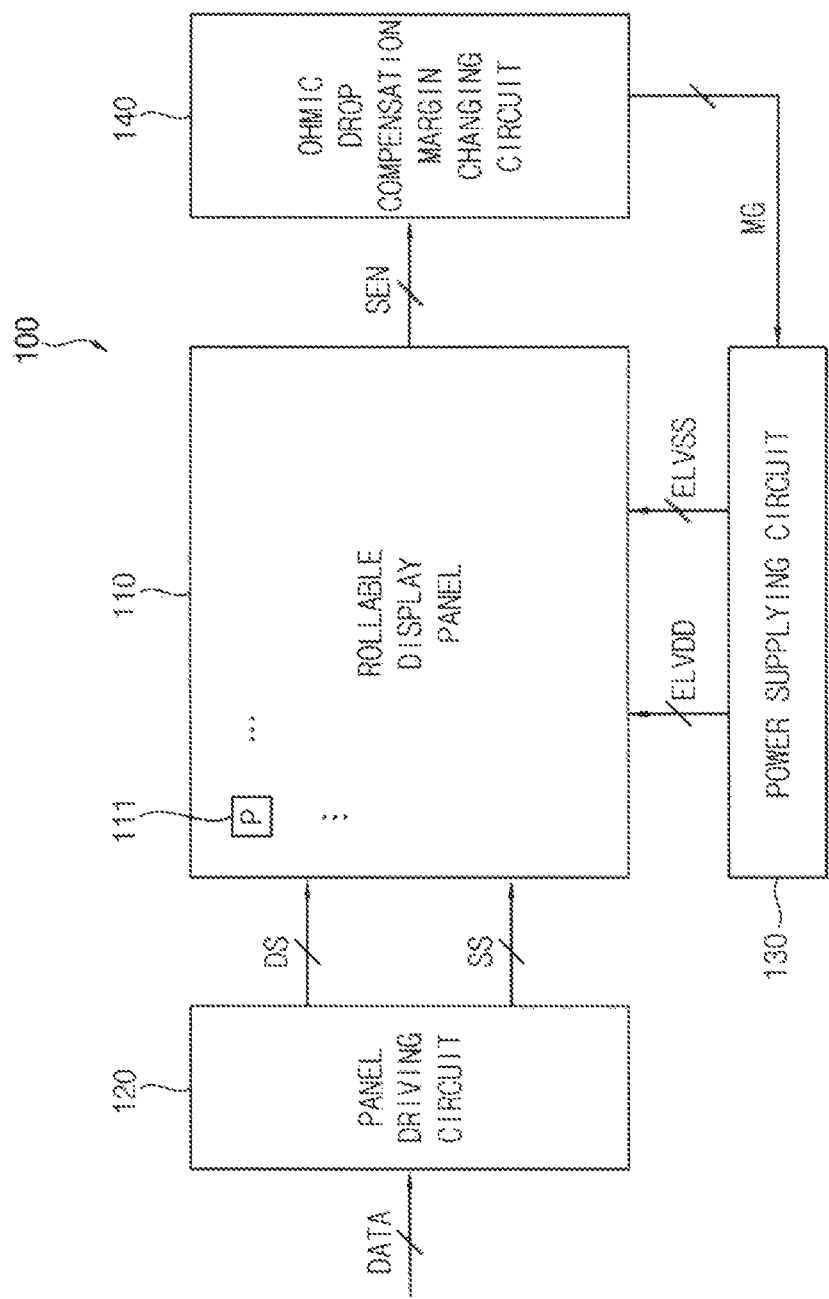

ROLLABLE DISPLAY DEVICE AND ELECTRONIC DEVICE INCLUDING THE SAME

CROSS-REFERENCE TO RELATED APPLICATION

This application claims priority from and the benefit of Korean Patent Application No. 10-2016-0115378, filed on Sep. 8, 2016, which is hereby incorporated by reference for all purposes as if fully set forth herein.

BACKGROUND

Field

Exemplary embodiments relate generally to an electronic device. More particularly, exemplary embodiments relate to a rollable display device (or a rolltop display device, a bendable display device, a flexible display device, etc.) that can be rolled and unrolled by a user, and an electronic device including the rollable display device.

Discussion of the Background

Recently, consumers attribute greater importance to a design of an electronic device when purchasing the electronic device. Further, some consumers prefer a portable electronic device that is capable of providing a relatively large image to a user. Accordingly, a rollable display device is spotlighted as a display device of an electronic device. Generally, the rollable display device may be rolled to reduce its size when carried, and may be unrolled to provide relatively large images to a user when used.

A rollable display device may display images on an unrolled region (e.g., a display region) of a rollable display panel, but may not display the images on a rolled region (e.g., a non-display region) of the rollable display panel. In other words, the rollable display device may display images having different sizes based on the size of an unrolled portion of the rollable display panel (e.g., according to an area of the display region of the rollable display panel).

While maximum ohmic (IR) drop may vary according to the degree that the rollable display panel is unrolled, however, a conventional rollable display device may set an equal ohmic drop compensation margin of a low power voltage ELVSS to compensate ohmic drops, regardless of the degree that the rollable display panel is unrolled. As such, the conventional rollable display device may consume unnecessary power when the area of the display region of the rollable display panel is relatively small (e.g., when the rollable display panel is unrolled to the lesser degree).

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a rollable display device that provides a sufficient ohmic drop compensation margin when an area of a display region of a rollable display panel is relatively large (e.g., when the rollable display panel is unrolled to the greater degree), and prevent unnecessary power consumption when the area of the display region of the rollable display panel is relatively small (e.g., when the rollable display panel is unrolled to the lesser degree) by changing an ohmic drop compensation margin of a low power voltage ELVSS for compensating ohmic drops, based on the degree that the rollable display panel is unrolled (e.g., based on how much the rollable display panel is unrolled).

Exemplary embodiments also provide an electronic device including the rollable display device that can achieve optimized power consumption.

Additional aspects will be set forth in the detailed description which follows, and, in part, will be apparent from the disclosure, or may be learned by practice of the inventive concept.

According to an exemplary embodiment, a rollable display device includes a rollable display panel including a plurality of pixels each including an organic light emitting element, a panel driving circuit configured to drive the rollable display panel, a power supplying circuit configured to supply a high power voltage and a low power voltage to the rollable display panel, such that the organic light emitting element emits light based on the high power voltage and the low power voltage, and an ohmic drop compensation margin changing circuit configured to sense a degree that the rollable display panel is unrolled and change an ohmic drop compensation margin of the low power voltage to compensate ohmic drops based on the degree that the rollable display panel is unrolled.

The ohmic drop compensation margin changing circuit may be configured to increase the ohmic drop compensation margin of the low power voltage as the degree that the rollable display panel is unrolled increases, and decrease the ohmic drop compensation margin of the low power voltage as the degree that the rollable display panel is unrolled decreases.

The ohmic drop compensation margin changing circuit may be configured to continuously increase or decrease the ohmic drop compensation margin of the low power voltage as the degree that the rollable display panel is unrolled increases or decreases.

The ohmic drop compensation margin changing circuit may be configured to discretely increase or decrease the ohmic drop compensation margin of the low power voltage as the degree that the rollable display panel is unrolled increases or decreases.

The power supplying circuit may be configured to provide a maximum voltage of the ohmic drop compensation margin of the low power voltage as the low power voltage to a first region of a display region of the rollable display panel having the smaller ohmic drop.

The maximum voltage of the ohmic drop compensation margin of the low power voltage may be constant regardless of the degree that the rollable display panel is unrolled.

The power supplying circuit may be configured to provide a minimum voltage of the ohmic drop compensation margin of the low power voltage as the low power voltage to a second region of the display region having the largest ohmic drop.

The minimum voltage of the ohmic drop compensation margin of the low power voltage may decrease as the degree that the rollable display panel is unrolled increases, and the minimum voltage of the ohmic drop compensation margin of the low power voltage may increase as the degree that the rollable display panel is unrolled decreases.

The ohmic drop compensation margin changing circuit may be configured to determine the ohmic drop compensation margin of the low power voltage based on predetermined mapping information between the degree that the rollable display panel is unrolled and the ohmic drop compensation margin of the low power voltage.

The ohmic drop compensation margin changing circuit may be configured to adjust the ohmic drop compensation margin of the low power voltage based on gray-scale information indicating gray-scales of image data that corresponds to an image to be displayed on the rollable display panel.

The ohmic drop compensation margin changing circuit may be configured to adjust the ohmic drop compensation margin of the low power voltage based on ohmic drop information comprising measured ohmic drops of a display region of the rollable display panel.

The ohmic drop compensation margin changing circuit may be configured to adjust the ohmic drop compensation margin of the low power voltage based on gray-scale information indicating gray-scales of image data that corresponds to an image to be displayed on the rollable display panel, and ohmic drop information comprising measured ohmic drops of a display region of the rollable display panel.

According to an exemplary embodiment, an electronic device includes a rollable display device, a rolling detection sensor configured to generate a rolling detection signal indicating whether the rollable display device is rolled or unrolled, and a processor configured to control a displaying operation of the rollable display device based on the rolling detection signal. The rollable display device includes a rollable display panel including a plurality of pixels each including an organic light emitting element, a panel driving circuit configured to drive the rollable display panel, a power supplying circuit configured to supply a high power voltage and a low power voltage to the rollable display panel, such that the organic light emitting element emits light based on the high power voltage and the low power voltage, and an ohmic drop compensation margin changing circuit configured to sense a degree that the rollable display panel is unrolled and change an ohmic drop compensation margin of the low power voltage to compensate ohmic drops based on the degree that the rollable display panel is unrolled.

The ohmic drop compensation margin changing circuit may be configured to increase the ohmic drop compensation margin of the low power voltage as the degree that the rollable display panel is unrolled increases, and decrease the ohmic drop compensation margin of the low power voltage as the degree that the rollable display panel is unrolled decreases.

The ohmic drop compensation margin changing circuit may be configured to continuously increase or decrease the ohmic drop compensation margin of the low power voltage as the degree that the rollable display panel is unrolled increases or decreases.

The ohmic drop compensation margin changing circuit may be configured to discretely increase or decrease the ohmic drop compensation margin of the low power voltage as the degree that the rollable display panel is unrolled increases or decreases.

The power supplying circuit may be configured to provide a maximum voltage of the ohmic drop compensation margin of the low power voltage as the low power voltage to a first region of a display region of the rollable display panel having the smallest ohmic drop.

The maximum voltage of the ohmic drop compensation margin of the low power voltage may be constant regardless of the degree that the rollable display panel is unrolled.

The power supplying circuit may be configured to provide a minimum voltage of the ohmic drop compensation margin of the low power voltage as the low power voltage to a second region of the display region having the largest ohmic drop.

The minimum voltage of the ohmic drop compensation margin of the low power voltage may be configured to decrease as the degree that the rollable display panel is unrolled increases, and the minimum voltage of the ohmic drop compensation margin of the low power voltage may be configured to increase as the degree that the rollable display panel is unrolled decreases.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 1 is a block diagram illustrating a rollable display device according to an exemplary embodiment.

DETAILED DESCRIPTION OF THE ILLUSTRATED EMBODIMENTS

Figure 2A:
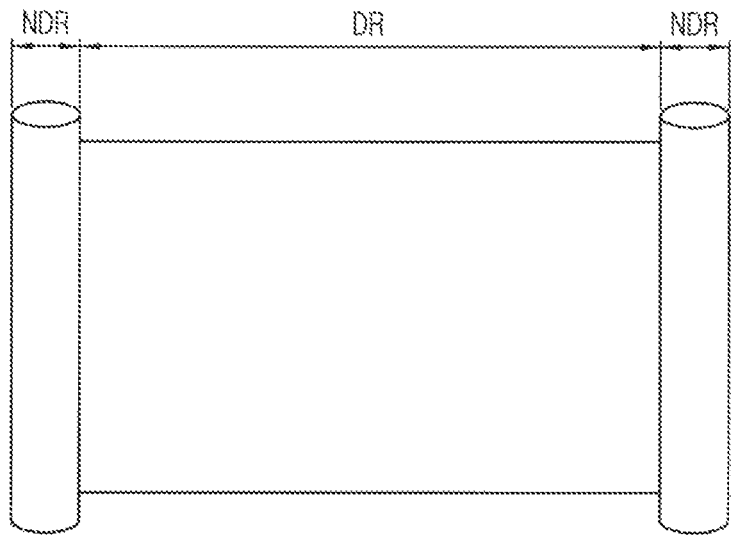
FIG. 2A is a diagram illustrating a rollable display panel that is unrolled relatively to the greater degree in the rollable display device of FIG. 1.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2B:
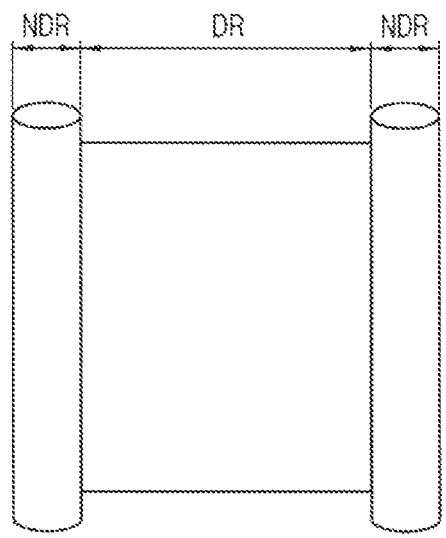
FIG. 2B is a diagram illustrating a rollable display panel that is unrolled relatively to the lesser degree in the rollable display device of FIG. 1.
Figure 3:
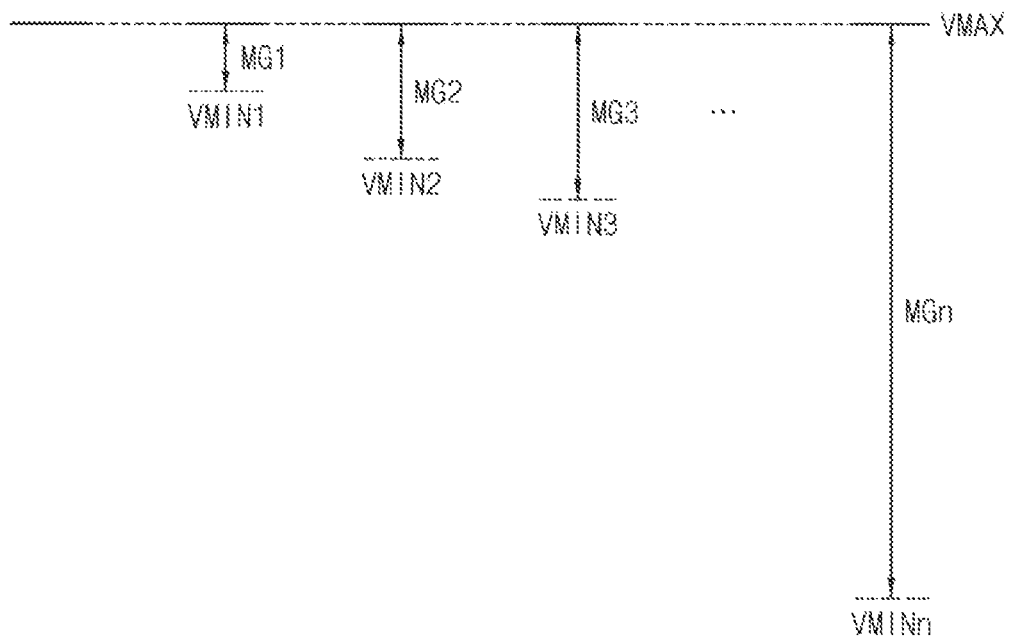
FIG. 3 is a diagram illustrating an ohmic drop compensation margin of a low power voltage according to the degree that a rollable display panel is unrolled in the rollable display device of FIG. 1, according to an exemplary embodiment.

FIG. 1 is a block diagram illustrating a rollable display device according to an exemplary embodiment. FIG. 2A is a diagram illustrating a rollable display panel that is unrolled relatively to the greater degree in the rollable display device of FIG. 1. FIG. 2B is a diagram illustrating a rollable display panel that is unrolled relatively to the lesser degree in the rollable display device of FIG. 1. FIG. 3 is a diagram illustrating an ohmic drop compensation margin of a low power voltage based on the degree that a rollable display panel is unrolled in the rollable display device of FIG. 1.

Referring to FIGS. 1 through 3, the rollable display device 100 may include a rollable display panel 110, a panel driving circuit 120, a power supplying circuit 130, and an ohmic drop compensation margin changing circuit 140. As used herein, the rollable display device 100 may be a display device (or a rolltop display device, a bendable display device, a flexible display device, etc.) in which an area of a display region of the rollable display panel 110 may change according to a change of the shape of the rollable display panel 110.

The rollable display panel 110 may include a plurality of pixels 111. In an exemplary embodiment, the pixels 111 may include red color (R) displaying pixels, green color (G) displaying pixels, and blue color (B) displaying pixels. Alternatively, the pixels 111 may include red color (R) displaying pixels, green color (G) displaying pixels, blue color (B) displaying pixels, and white color (W) displaying pixels. As such, the rollable display panel 110 may display (or output) images using the pixels 111.

Each of the pixels 111 may include an organic light emitting element, such as an organic light emitting diode or etc. In each of the pixels 111, the organic light emitting element may emit light based on a current flowing through the organic light emitting element between a high power voltage ELVDD and a low power voltage ELVSS, where the current is controlled by a driving transistor (not shown). The rollable display panel 110 may include flexible materials, such that the rollable display panel 110 may be rolled or unrolled by a user.

The panel driving circuit 120 may drive the rollable display panel 110, and may include a scan driver, a data driver, a timing controller, and etc. The rollable display panel 110 may be connected to the panel driving circuit 120 via scan-lines and data-lines. The scan driver may provide a scan signal SS to the rollable display panel 110 via the scan-lines. The data driver may provide a data signal DS to the rollable display panel 110 via the data-lines. The timing controller may control the scan driver, the data driver, and etc. However, the structure of the panel driving circuit 120 may be varied, and thus, components of the panel driving circuit 120 are not limited thereto.

The power supplying circuit 130 may provide the high power voltage ELVDD and the low power voltage ELVSS to the rollable display panel 110, in which the organic light emitting element included in each of the pixels 111 emits light based on the high power voltage ELVDD and the low power voltage ELVSS. In exemplary embodiments, the power supplying circuit 130 may generate the low power voltage ELVSS having an ohmic drop compensation margin MG, when supplying the low power voltage ELVSS to the rollable display panel 110.

As described above, in each of the pixels 111, the organic light emitting element may emit light based on the current flowing through the organic light emitting element between the high power voltage ELVDD and the low power voltage ELVSS, where the current is controlled by the driving transistor. Thus, when the low power voltage ELVSS is equally applied to the pixels 111, light-emitting luminance of the organic light emitting element included in each of the pixels 111 may be relatively high when the high power voltage ELVDD applied to each of the pixels 111 is relatively high, and the light-emitting luminance of the organic light emitting element included in each of the pixels 111 may be relatively low when the high power voltage ELVDD applied to each of the pixels 111 is relatively low.

In general, current flowing through the organic light emitting element may be controlled by the data signal DS applied to each of the pixels 111, rather than the high power voltage ELVDD or the low power voltage ELVSS applied to each of the pixels 111. As such, high power voltage ELVDD should be equally applied to the pixels 111. However, since the high power voltage ELVDD is typically applied from the power supplying circuit 130 to each of the pixels 111 via power-lines, a voltage drop (e.g., an ohmic drop) may occur when the high power voltage ELVDD is transferred via the power-lines. Thus, the pixels 111 that are relatively disposed far from the power supplying circuit 130 may receive the high power voltage ELVDD having a relatively low voltage level (e.g., an ohmic dropped voltage level), as compared to the pixels 111 that are relatively disposed closer to the power supplying circuit 130. As such, even when the same data signal DS is applied to the pixels 111, the light-emitting luminance of the pixel 111 that is relatively far from the power supplying circuit 130 may be lower than that of the pixel 111 that is relatively closer to the power supplying circuit 130.

To overcome this problem, a conventional rollable display device may achieve luminance uniformity by setting the ohmic drop compensation margin MG of the low power voltage ELVSS to compensate the ohmic drops in the pixels 111. In particular, a conventional rollable display device may equally set the ohmic drop compensation margin MG of the low power voltage ELVSS, regardless of the degree SEN that the rollable display panel 110 is unrolled. However, since the maximum ohmic drop in the rollable display panel 110 may vary according to the degree SEN that the rollable display panel 110 is unrolled, the conventional rollable display device may consume unnecessary power when an area of a display region DR of the rollable display panel 110 is relatively small (e.g., when the degree SEN that the rollable display panel 110 is unrolled is relatively small).

According to an exemplary embodiment, the rollable display device 100 may change the ohmic drop compensation margin MG of the low power voltage ELVSS based on how much the rollable display panel 110 is unrolled. More particularly, the ohmic drop compensation margin changing circuit 140 may sense the degree SEN that the rollable display panel 110 is unrolled, and change the ohmic drop compensation margin MG of the low power voltage ELVSS based on the degree SEN that the rollable display panel 110 is unrolled.

In an exemplary embodiment, the ohmic drop compensation margin changing circuit 140 may sense the degree SEN that the rollable display panel 110 is unrolled by sensing light emitted from the rollable display panel 110 using a light receiving sensor. However, a method of sensing the degree SEN that the rollable display panel 110 is unrolled is not limited thereto. For example, the ohmic drop compensation margin changing circuit 140 may sense the degree SEN that the rollable display panel 110 is unrolled using various methods.

As illustrated in FIGS. 2A and 2B, the rollable display device 100 may perform a displaying operation that corresponds to the degree SEN that the rollable display panel 110 is unrolled. For example, the rollable display device 100 may display images on the display region DR (i.e., the unrolled region) of the rollable display panel 110 and may not display the images on the non-display region NDR (i.e., the rolled region) of the rollable display panel 110.

In particular, the rollable display device 100 may display images having different sizes according to the degree SEN that the rollable display panel 110 is unrolled. As illustrated in FIG. 2A, when the area of the display region DR of the rollable display panel 110 is relatively large (e.g., when the degree SEN that the rollable display panel 110 is unrolled is relatively large), a length of the power-line through which the high power voltage ELVDD is transferred may be relatively long. Thus, the maximum ohmic drop that may occur in the display region DR of the rollable display panel 110 may be relatively large.

As illustrated in FIG. 2B, when the area of the display region DR of the rollable display panel 110 is relatively small (e.g., when the degree SEN that the rollable display panel 110 is unrolled is relatively small), the length of the power-line through which the high power voltage ELVDD is transferred may be relatively short. Thus, the maximum ohmic drop that may occur in the display region DR of the rollable display panel 110 may be relatively small. As such, the ohmic drop compensation margin changing circuit 140 may increase the ohmic drop compensation margin MG of the low power voltage ELVSS as the degree SEN that the rollable display panel 110 is unrolled increases, and may decrease the ohmic drop compensation margin MG of the low power voltage ELVSS as the degree SEN that the rollable display panel 110 is unrolled decreases.

More particularly, since the maximum ohmic drop that occurs in the display region DR of the rollable display panel 110 may increase as the degree SEN that the rollable display panel 110 is unrolled increases, the ohmic drop compensation margin changing circuit 140 may increase the ohmic drop compensation margin MG of the low power voltage ELVSS to compensate for the ohmic drops. On the other hand, since the maximum ohmic drop that occurs in the display region DR of the rollable display panel 110 may decrease as the degree SEN that the rollable display panel 110 is unrolled decreases, the ohmic drop compensation margin changing circuit 140 may decrease the ohmic drop compensation margin MG of the low power voltage ELVSS to compensate for the ohmic drops.

For example, as illustrated in FIG. 3, the ohmic drop compensation margin changing circuit 140 may increase the ohmic drop compensation margin MG of the low power voltage ELVSS (indicated by MG1, MG2, . . . , MGn) as the area of the display region DR of the rollable display panel 110 increases (indicated by DR-SIZE INCREASING), that is, as the degree SEN that the rollable display panel 110 is unrolled increases.

In an exemplary embodiment, the ohmic drop compensation margin changing circuit 140 may discretely increase or decrease the ohmic drop compensation margin MG of the low power voltage ELVSS as the degree SEN that the rollable display panel 110 is unrolled increases or decreases. More particularly, because the maximum ohmic drops of the pixels 111 that are in a similar distance from the power supplying circuit 130 are similar, the pixels 111 may be grouped based on the distance from the power supplying circuit 130, and the ohmic drop compensation margin MG of the low power voltage ELVSS may be the same for the pixels in the same group. In this case, the accuracy of the ohmic drop compensation margin MG of the low power voltage ELVSS may be decreased, but the load of the power supplying circuit 130 for subdividing the ohmic drop compensation margin MG of the low power voltage ELVSS may be decreased.

In an exemplary embodiment, the ohmic drop compensation margin changing circuit 140 may continuously increase or decrease the ohmic drop compensation margin MG of the low power voltage ELVSS as the degree SEN that the rollable display panel 110 is unrolled increases or decreases. In this case, the accuracy of the ohmic drop compensation margin MG of the low power voltage ELVSS may be increased, but the load of the power supplying circuit 130 for subdividing the ohmic drop compensation margin MG of the low power voltage ELVSS may be increased.

In exemplary embodiments, the power supplying circuit 130 may provide a maximum voltage VMAX of the ohmic drop compensation margin MG of the low power voltage ELVSS as the low power voltage ELVSS to a first region having the smallest ohmic drop in the display region DR of the rollable display panel 110. As illustrated in FIG. 3, the maximum voltage VMAX of the ohmic drop compensation margin MG of the low power voltage ELVSS may be constant (or fixed) regardless of the area of the display region DR of the rollable display panel 110. In addition, the power supplying circuit 130 may provide a minimum voltage VMIN of the ohmic drop compensation margin MG of the low power voltage ELVSS as the low power voltage ELVSS to a second region having the largest ohmic drop in the display region DR of the rollable display panel 110.

As illustrated in FIG. 3, the minimum voltage VMIN of the ohmic drop compensation margin MG of the low power voltage ELVSS may decrease as the degree SEN that the rollable display panel 110 is unrolled increases, and may increase as the degree SEN that the rollable display panel 110 is unrolled decreases. More particularly, since the maximum voltage VMAX of the ohmic drop compensation margin MG of the low power voltage ELVSS is constant, as the area of the display region DR of the rollable display panel 110 increases (as indicated by DR-SIZE INCREASING), the minimum voltage VMIN of the ohmic drop compensation margin MG of the low power voltage ELVSS needs to lowered (as indicated by VMIN1, . . . , VMINn), in order to increase the ohmic drop compensation margin MG of the low power voltage ELVSS (as indicated by MG1, MG2, . . . , MGn).

As described above, the ohmic drop compensation margin changing circuit 140 may sense the degree SEN that the rollable display panel 110 is unrolled, and may change the ohmic drop compensation margin MG of the low power voltage ELVSS based on the degree SEN that the rollable display panel 110 is unrolled. Here, the ohmic drop compensation margin changing circuit 140 may increase the ohmic drop compensation margin MG of the low power voltage ELVSS as the area of the display region DR of the rollable display panel 110 increases (e.g., as the degree SEN that the rollable display panel 110 is unrolled increases), and may decrease the ohmic drop compensation margin MG of the low power voltage ELVSS as the area of the display region DR of the rollable display panel 110 decreases (e.g., as the degree SEN that the rollable display panel 110 is unrolled decreases).

According to an exemplary embodiment, the ohmic drop compensation margin changing circuit 140 may determine the ohmic drop compensation margin MG of the low power voltage ELVSS based on predetermined mapping information between the degree SEN that the rollable display panel 110 is unrolled and the ohmic drop compensation margin MG of the low power voltage ELVSS. In this case, the ohmic drop compensation margin changing circuit 140 may include a mapping table that stores the predetermined mapping information between the degree SEN that the rollable display panel 110 is unrolled and the ohmic drop compensation margin MG of the low power voltage ELVSS.

In exemplary embodiments, the ohmic drop compensation margin changing circuit 140 may adjust the ohmic drop compensation margin MG of the low power voltage ELVSS based on grayscale information indicating grayscales of image data DATA, which correspond to an image to be displayed on the rollable display panel 110. In this case, the ohmic drop compensation margin changing circuit 140 may further include a data analyzing block that analyzes the grayscales of the image data DATA. For example, the ohmic drop compensation margin changing circuit 140 may adjust the ohmic drop compensation margin MG of the low power voltage ELVSS using a maximum grayscale and/or an average grayscale of the image data DATA analyzed by the data analyzing block. However, a method of adjusting the ohmic drop compensation margin MG of the low power voltage ELVSS using the data analyzing block is not limited thereto.

In exemplary embodiments, the ohmic drop compensation margin changing circuit 140 may adjust the ohmic drop compensation margin MG of the low power voltage ELVSS based on measured ohmic drop information, which may be based on actually measured ohmic drops of the display region DR of the rollable display panel 110. In this case, the ohmic drop compensation margin changing circuit 140 may further include an ohmic drop measuring block that measures the ohmic drops of the display region DR of the rollable display panel 110. For example, the ohmic drop compensation margin changing circuit 140 may adjust the ohmic drop compensation margin MG of the low power voltage ELVSS using a maximum ohmic drop and/or an average ohmic drop of the display region DR of the rollable display panel 110, where the maximum ohmic drop and/or the average ohmic drop are actually measured by the ohmic drop measuring block. However, a method of adjusting the ohmic drop compensation margin MG of the low power voltage ELVSS using the ohmic drop measuring block is not limited thereto.

Further, in exemplary embodiments, the ohmic drop compensation margin changing block 140 may adjust the ohmic drop compensation margin MG of the low power voltage ELVSS based on the grayscale information indicating the grayscales of the image data DATA and the actually measured ohmic drop information described above. In this case, the ohmic drop compensation margin changing circuit 140 may further include the data analyzing block that analyzes the grayscales of the image data DATA and the ohmic drop measuring block that measures the ohmic drops of the display region DR of the rollable display panel 110.

The rollable display device 100 according to exemplary embodiments may provide sufficient ohmic drop compensation margin MG when the area of the display region DR of the rollable display panel 110 is relatively large (e.g., when the degree SEN that the rollable display panel 110 is unrolled is relatively large) and may prevent the unnecessary power consumption when the area of the display region DR of the rollable display panel 110 is relatively small (e.g., when the degree SEN that the rollable display panel 110 is unrolled is relatively small), by changing the ohmic drop compensation margin MG of the low power voltage ELVSS for compensating the ohmic drops based on the degree SEN that the rollable display panel 110 is unrolled. Specifically, the rollable display device 100 may increase the ohmic drop compensation margin MG of the low power voltage ELVSS as the degree SEN that the rollable display panel 110 is unrolled increases, and may decrease the ohmic drop compensation margin MG of the low power voltage ELVSS as the degree SEN that the rollable display panel 110 is unrolled decreases.

For example, when the rollable display panel 110 is designed to operate at a panel driving voltage of 15V (i.e., a difference between the high power voltage ELVDD and the low power voltage ELVSS is 15V), the rollable display device 100 may set the ohmic drop compensation margin MG of the low power voltage ELVSS to be 8V to compensate for the ohmic drop when the display region DR of the rollable display panel 110 is unrolled to the maximum degree (or maximum display area), and may set the ohmic drop compensation margin MG of the low power voltage ELVSS to be 5V to compensate for the ohmic drop of the display region DR of the rollable display panel 110 that is unrolled to the lesser degree (or minimum display area). Generally, a conventional rollable display device that equally sets the ohmic drop compensation margin MG of the low power voltage ELVSS regardless of the degree SEN that the rollable display panel 110 is unrolled (e.g., the conventional rollable display device may set the ohmic drop compensation margin MG of the low power voltage ELVSS to be 8V regardless of the degree SEN that the rollable display panel 110 is unrolled) may consume the same power when the display region DR of the rollable display panel 110 has the minimum display area or the maximum display area. However, the rollable display device 100 according to an exemplary embodiment may consume less power corresponding to 3V (i.e., 8V-5V) when the display region DR of the rollable display panel 110 has the minimum display area, as compared to when the display region DR of the rollable display panel 110 has the maximum display area. That is, the rollable display device 100 may reduce power consumption when the display region DR of the rollable display panel 110 has the minimum display area. Although FIG. 1 illustrates that the rollable display device 100 includes the rollable display panel 110, the panel driving circuit 120, the power supplying circuit 130, and the ohmic drop compensation margin changing circuit 140, however, the rollable display device 100 may further include additional components other than the above. In addition, the ohmic drop compensation margin changing circuit 140 is illustrated in FIG. 1 as being external to the panel driving circuit 120 (e.g., separate and independent from the panel driving circuit 120), however, the ohmic drop compensation margin changing circuit 140 may alternatively be implemented within the panel driving circuit 120.

Figure 4:
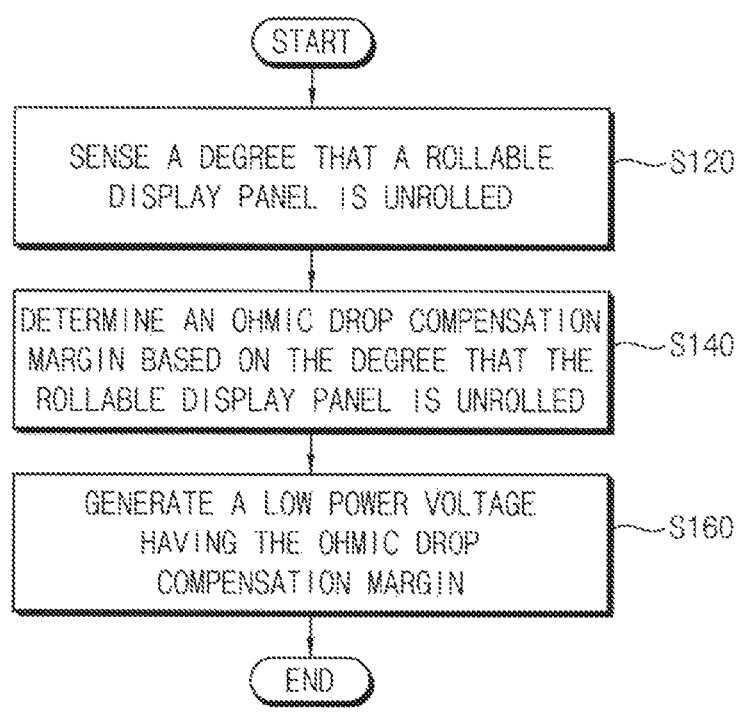
FIG. 4 is a flowchart illustrating a process of changing an ohmic drop compensation margin of a low power voltage according to an exemplary embodiment, based on the degree that a rollable display panel is unrolled in the rollable display device of FIG. 1.
Figure 5:
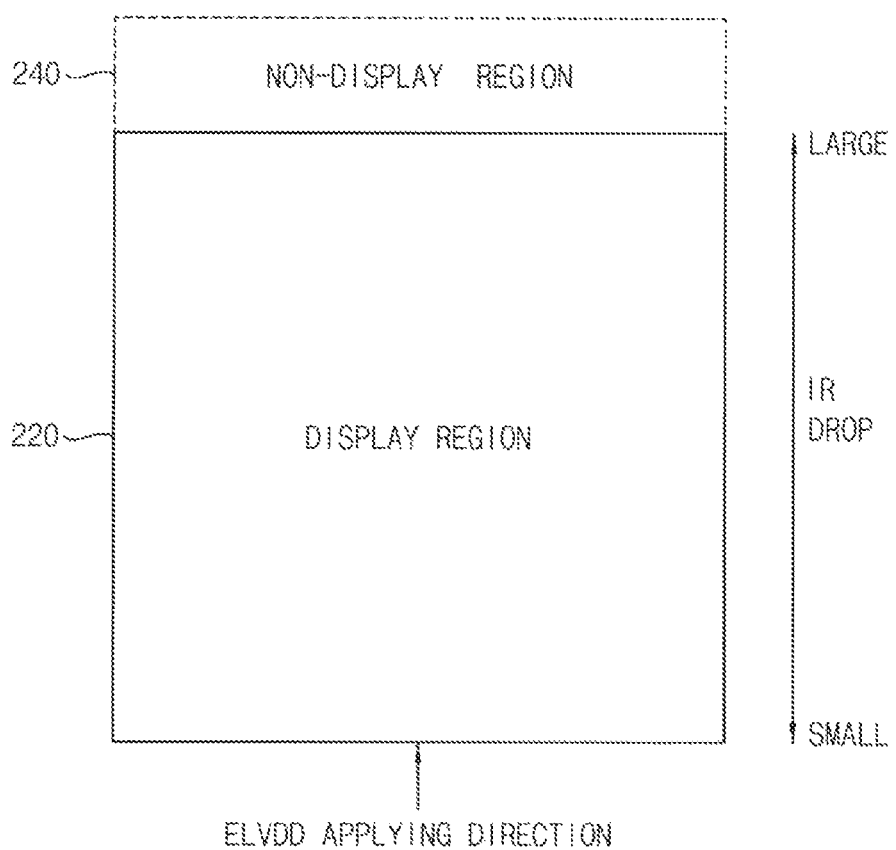
FIG. 5 is a diagram for describing an ohmic drop that occurs in a display region of a rollable display panel included in the rollable display device of FIG. 1.
Figure 6A:
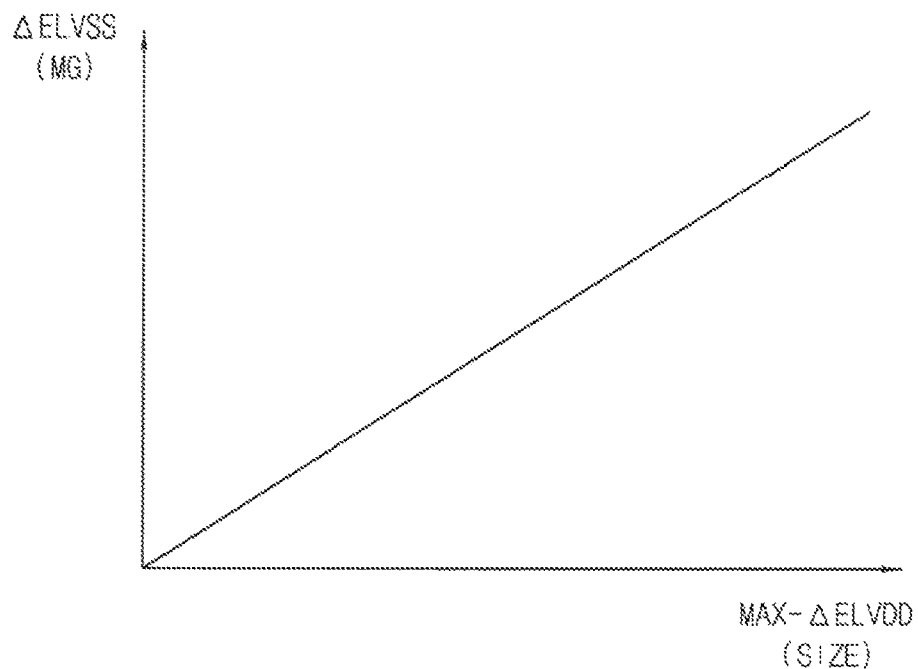
FIG. 6A and FIG. 6B are graphs illustrating examples of determining an ohmic drop compensation margin for a low power voltage based on the degree that a rollable display panel is unrolled in the rollable display device of FIG. 1.

FIG. 4 is a flowchart illustrating a process of changing an ohmic drop compensation margin of a low power voltage based on the degree that a rollable display panel is unrolled in the rollable display device of FIG. 1. FIG. 5 is a diagram for describing an ohmic drop that occurs in a display region of a rollable display panel included in the rollable display device of FIG. 1. FIG. 6A is a graph illustrating an example of determining an ohmic drop compensation margin for a low power voltage based on the degree that a rollable display panel is unrolled in the rollable display device of FIG. 1.

Figure 6B:
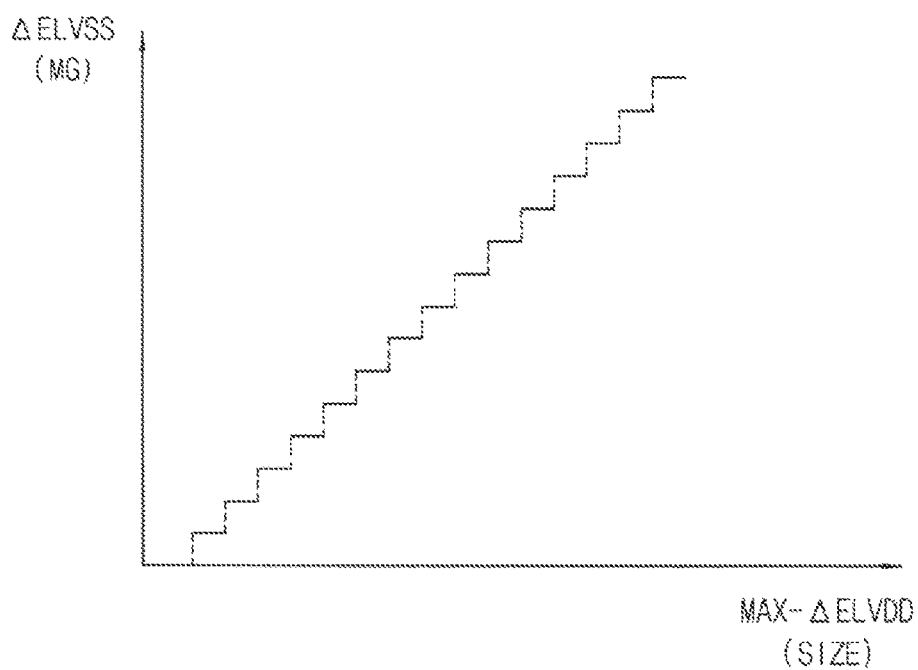

FIG. 6B is a graph illustrating another example of determining an ohmic drop compensation margin for a low power voltage based on the degree that a rollable display panel is unrolled in the rollable display device of FIG. 1.

Referring to FIG. 4, the rollable display device 100 may sense the degree SEN that the rollable display panel 110 is unrolled (S120), determine the ohmic drop compensation margin MG of the low power voltage ELVSS based on the degree SEN that the rollable display panel 110 is unrolled (S140), and then generate the low power voltage ELVSS having the ohmic drop compensation margin MG (S160).

Referring to FIG. 5, the rollable display device 100 may display images on the display region 220 of the rollable display panel 110 (e.g., the unrolled region of the rollable display panel 110), but may not display the images on the non-display region 240 of the rollable display panel 110 (e.g., the rolled region of the rollable display panel 110). Thus, the ohmic drop (as indicated by IR DROP) in the display region 220 should be taken into account when the rollable display device 100 performs the displaying operation, while the ohmic drop may not need to be considered in the non-display region 240 of the rollable display panel 110. When the high power voltage ELVDD is applied in a direction indicated by ELVDD APPLYING DIRECTION from a first side of the rollable display panel 110 to a second, opposing side of the rollable display panel, the ohmic drop of the pixels 111 included in the display region 220 that are adjacent to the first side of the rollable display panel 110 may be relatively small, and the ohmic drop of the pixels 111 that are adjacent to the second side of the rollable display panel 110 may be relatively large. Accordingly, the ohmic drop compensation may be weakly performed on the pixels 111 adjacent to the first side of the rollable display panel 110, but the ohmic drop compensation may be strongly performed on the pixels 111 adjacent to the second side of the rollable display panel 110.

Here, as the area of the display region 220 of the rollable display panel 110 increases (e.g., as the degree SEN that the rollable display panel 110 is unrolled increases), a distance between the power supplying circuit 130 that supplies the high power voltage ELVDD and the pixels 111 adjacent to the second side of the rollable display panel 110 is increased. Thus, the ohmic drop compensation margin MG of the low power voltage ELVSS may be increased to properly perform the ohmic drop compensation. On the other hand, as the area of the display region 220 of the rollable display panel 110 decreases (e.g., as the degree SEN that the rollable display panel 110 is unrolled decreases), a distance between the power supplying circuit 130 and the pixels 111 adjacent to the second side of the rollable display panel 110 is decreased. Thus, the ohmic drop compensation margin MG of the low power voltage ELVSS may be decreased to reduce power consumption.

The rollable display device 100 according to an exemplary embodiment may sense the degree SEN that the rollable display panel 110 is unrolled and may change the ohmic drop compensation margin MG of the low power voltage ELVSS by using the ohmic drop compensation margin changing circuit 140 based on the degree SEN that the rollable display panel 110 is unrolled. Specifically, by using the ohmic drop compensation margin changing circuit 140, the rollable display device 100 may increase the ohmic drop compensation margin MG of the low power voltage ELVSS when the area of the display region 220 of the rollable display panel 110 increases, such that the degree SEN that the rollable display panel 110 is unrolled increases, and may decrease the ohmic drop compensation margin MG of the low power voltage ELVSS when the area of the display region 220 of the rollable display panel 110 decreases, such that the degree SEN that the rollable display panel 110 is unrolled decreases.

Referring to FIG. 6A, the rollable display device 100 according to an exemplary embodiment may continuously increase or decrease the ohmic drop compensation margin MG of the low power voltage ELVSS through the ohmic drop compensation margin changing unit 140, as the degree SEN that the rollable display panel 110 is unrolled increases or decreases. In other words, the area of the display region 220 of the rollable display panel 110 (indicated as SIZE) may have a proportional relationship to the maximum ohmic drop ($\Delta$ELVSS) that may occur in the display region 220 of the rollable display panel 110. As such, the rollable display device 100 may continuously increase the ohmic drop compensation margin MG of the low power voltage ELVSS that corresponds to a difference $\Delta$ELVSS between the maximum voltage and the minimum voltage of the low power voltage ELVSS, such that the low power voltage ELVSS with the increased ohmic drop compensation margin MG may be applied to the display region 220 of the rollable display panel 110, as the area of the display region 220 of the rollable display panel 110 increases. On the other hand, the rollable display device 100 may continuously decrease the ohmic drop compensation margin MG of the low power voltage ELVSS and apply the low power voltage ELVSS with the decreased ohmic drop compensation margin MG may be applied to the display region 220 of the rollable display panel 110, as the area of the display region 220 of the rollable display panel 110 decreases. In this case, the accuracy of the ohmic drop compensation margin MG of the low power voltage ELVSS may be increased, but the load of the power supplying circuit 130 for subdividing the ohmic drop compensation margin MG of the low power voltage ELVSS may be increased.

Referring to FIG. 6B, the rollable display device 100 may discretely increase or decrease the ohmic drop compensation margin MG of the low power voltage ELVSS by using the ohmic drop compensation margin changing circuit 140, as the degree SEN that the rollable display panel 110 is unrolled increases or decreases. In other words, the area of the display region 220 of the rollable display panel 110 may have a proportional relationship to the maximum ohmic drop ($\Delta$ELVSS) that may be occurred in the display region 220 of the rollable display panel 110. As such, the rollable display device 100 may discretely increase the ohmic drop compensation margin MG of the low power voltage ELVSS that corresponds to the difference $\Delta$ELVSS between the maximum voltage and the minimum voltage of the low power voltage ELVSS, and apply the low power voltage ELVSS with increased ohmic drop compensation margin MG of the low power voltage ELVSS to the display region 220 of the rollable display panel 110, as the area of the display region 220 of the rollable display panel 110 increases. On the other hand, the rollable display device 100 may discretely decrease the ohmic drop compensation margin MG of the low power voltage ELVSS that corresponds to the difference $\Delta$ELVSS between the maximum voltage and the minimum voltage of the low power voltage ELVSS, such that the low power voltage ELVSS with the decreased ohmic drop compensation margin MG is applied to the display region 220 of the rollable display panel 110, as the area of the display region 220 of the rollable display panel 110 decreases. In this case, the accuracy of the ohmic drop compensation margin MG of the low power voltage ELVSS may be decreased, but the load of the power supplying circuit 130 for subdividing the ohmic drop compensation margin MG of the low power voltage ELVSS may be decreased.

Figure 7:
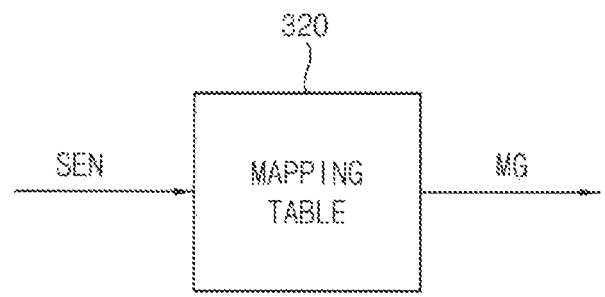
FIG. 7, FIG. 8, FIG. 9, and FIG. 10 are block diagrams illustrating examples of determining an ohmic drop compensation margin of a low power voltage is determined based on the degree that a rollable display panel is unrolled in the rollable display device of FIG. 1.
Figure 8:
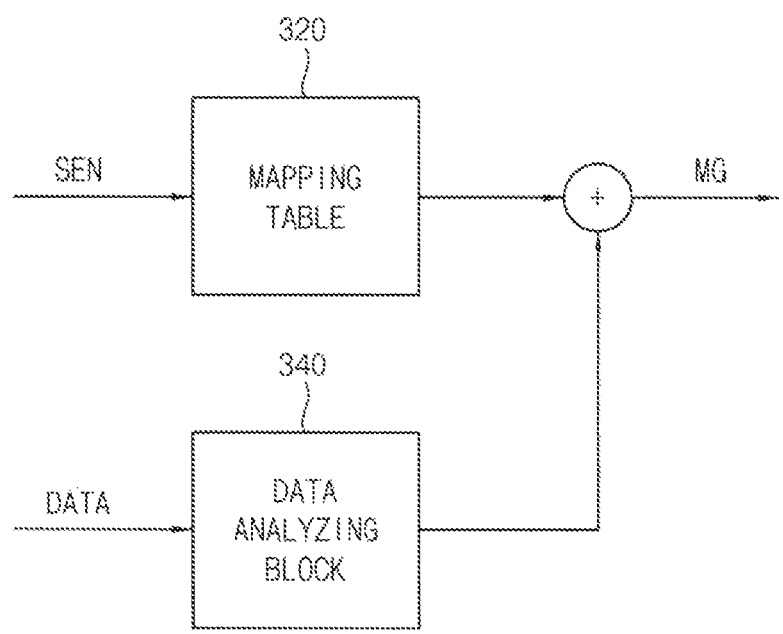
Figure 9:
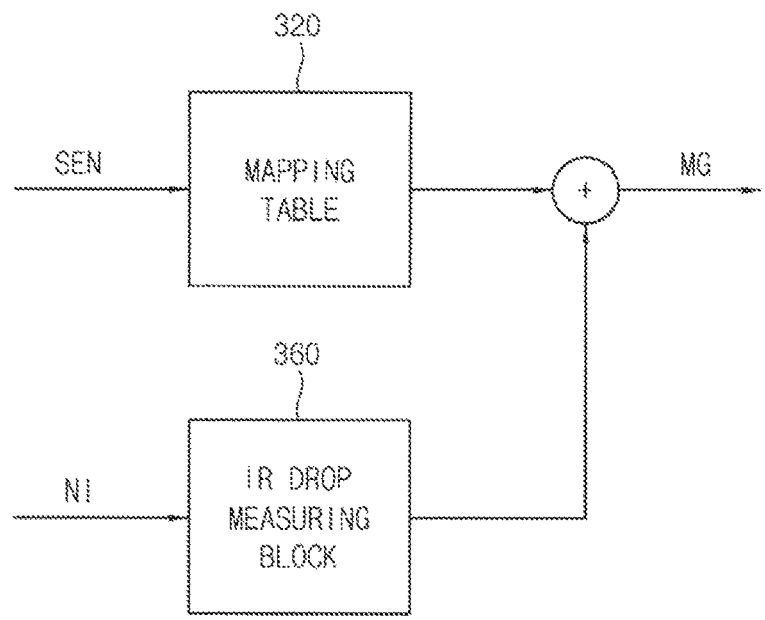

FIGS. 7 to 9 are block diagrams each illustrating an example of determining an ohmic drop compensation margin of a low power voltage based on the degree that a rollable display panel is unrolled in the rollable display device of FIG. 1.

Referring to FIGS. 7 through 10, the rollable display device 100 according to exemplary embodiments determines the ohmic drop compensation margin MG of the low power voltage ELVSS based on the degree SEN that the rollable display panel 110 is unrolled using the ohmic drop compensation margin changing circuit 140.

Referring to FIG. 7, the ohmic drop compensation margin changing circuit 140 according to an exemplary embodiment may include a mapping table 320 that stores predetermined mapping information between the degree SEN that the rollable display panel 110 is unrolled and the ohmic drop compensation margin MG of the low power voltage ELVSS. Here, the degree SEN that the rollable display panel 110 is unrolled and the ohmic drop compensation margin MG of the low power voltage ELVSS are mapped in the mapping table 320, such that the ohmic drop compensation margin MG of the low power voltage ELVSS increases as the degree SEN that the rollable display panel 110 is unrolled increases, or vice versa. In this case, the ohmic drop compensation margin changing circuit 140 may sense the degree SEN that the rollable display panel 110 is unrolled and may choose the corresponding ohmic drop compensation margin MG of the low power voltage ELVSS from the mapping table 320.

Referring to FIG. 8, the ohmic drop compensation margin changing circuit 140 according to an exemplary embodiment may include a mapping table 320 and a data analyzing block 340. The mapping table 320 may store predetermined mapping information between the degree SEN that the rollable display panel 110 is unrolled and the ohmic drop compensation margin MG of the low power voltage ELVSS. The data analyzing block 340 may analyze gray-scales of image data DATA, which corresponds to an image to be displayed on the rollable display panel 110. In this case, the ohmic drop compensation margin changing circuit 140 may sense the degree SEN that the rollable display panel 110 is unrolled, choose the corresponding ohmic drop compensation margin MG of the low power voltage ELVSS from the mapping table 320, and adjust the ohmic drop compensation margin MG of the low power voltage ELVSS by analyzing the gray-scales of the image data DATA.

Referring FIG. 9, the ohmic drop compensation margin changing circuit 140 according to an exemplary embodiment may include a mapping table 320 and an ohmic drop measuring block 360. The mapping table 320 may store predetermined mapping information between the degree SEN that the rollable display panel 110 is unrolled and the ohmic drop compensation margin MG of the low power voltage ELVSS. The ohmic drop measuring block 360 may measure ohmic drops of the display region of the rollable display panel 110. In this case, the ohmic drop compensation margin changing circuit 140 may sense the degree SEN that the rollable display panel 110 is unrolled, choose the ohmic drop compensation margin MG of the low power voltage ELVSS corresponding to the degree SEN that the rollable display panel 110 is unrolled from the mapping table 320, and adjust the ohmic drop compensation margin MG of the low power voltage ELVSS by reflecting actually measured ohmic drops NI of the display region of the rollable display panel 110.

Figure 10:
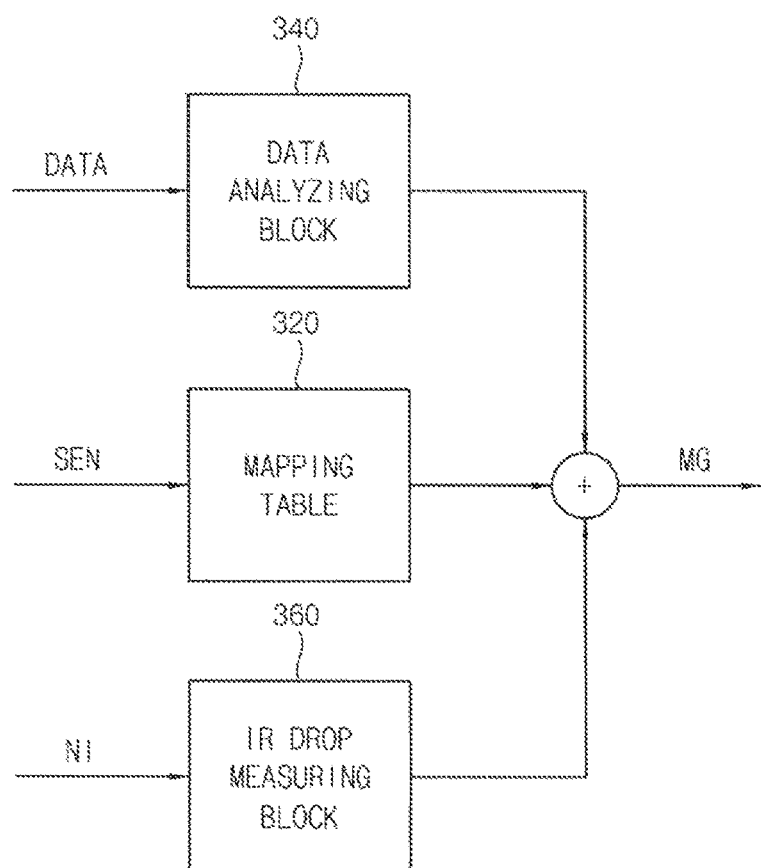

Referring to FIG. 10, the ohmic drop compensation margin changing circuit 140 according to an exemplary embodiment may include a mapping table 320, a data analyzing block 340, and an IR drop measuring block 360. The mapping table 320 may store predetermined mapping information between the degree SEN that the rollable display panel 110 is unrolled and the ohmic drop compensation margin MG of the low power voltage ELVSS. The data analyzing block 340 may analyze gray-scales of image data DATA corresponding to an image to be displayed on the rollable display panel 110. The ohmic drop measuring block 360 may measure ohmic drops of the display region of the rollable display panel 110. In this case, the ohmic drop compensation margin changing circuit 140 may sense the degree SEN that the rollable display panel 110 is unrolled, choose the ohmic drop compensation margin MG of the low power voltage ELVSS corresponding to the degree SEN that the rollable display panel 110 is unrolled from the mapping table 320, adjust the ohmic drop compensation margin MG of the low power voltage ELVSS by analyzing the gray-scales of the image data DATA, and adjust the ohmic drop compensation margin MG of the low power voltage ELVSS by reflecting actually measured ohmic drops NI of the display region of the rollable display panel 110.

Figure 11:
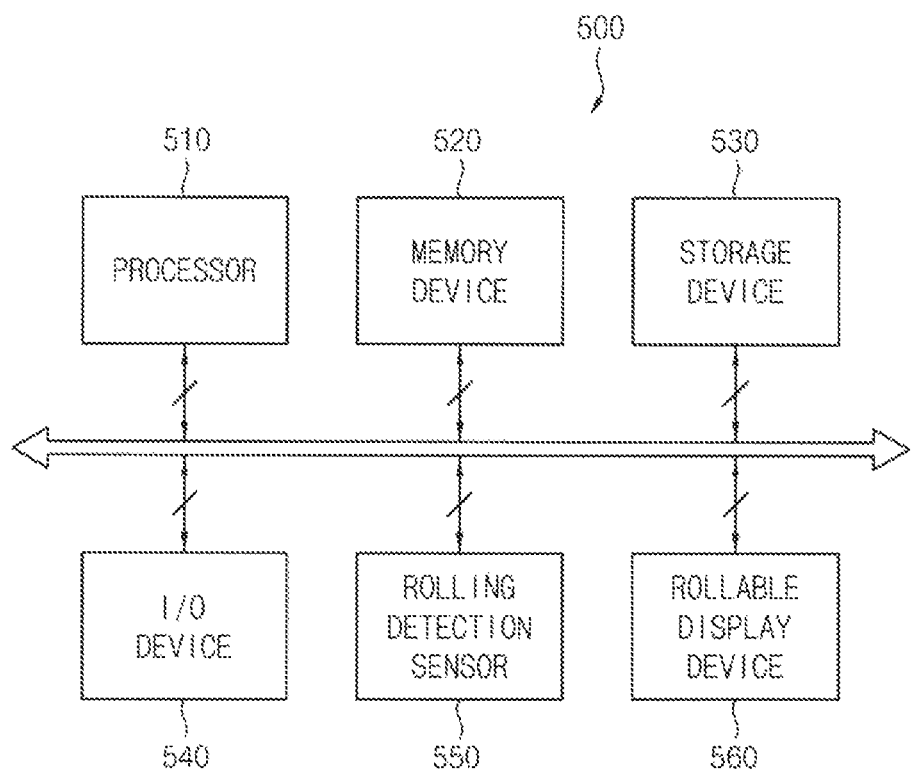
FIG. 11 is a block diagram illustrating an electronic device according to an exemplary embodiment.
Figure 12:
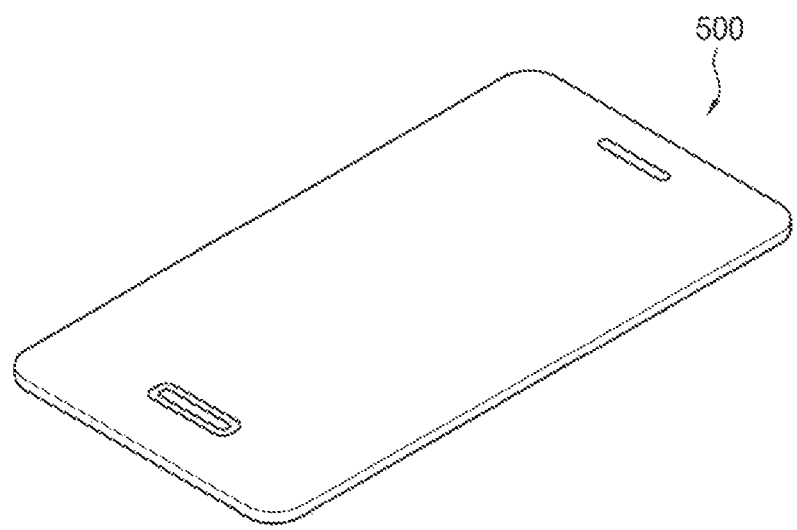
FIG. 12 is a diagram illustrating an example in which the electronic device of FIG. 11 is implemented as a flexible smart phone.

FIG. 11 is a block diagram illustrating an electronic device according to an exemplary embodiment. FIG. 12 is a diagram illustrating an electronic device of FIG. 11 implemented as a flexible smart phone.

Referring to FIGS. 11 and 12, an electronic device 500 according to an exemplary embodiment may include a processor 510, a memory device 520, a storage device 530, an input/output (I/O) device 540, a rolling detection sensor 550, and a rollable display device 560. The rollable display device 560 may be the rollable display device 100 of FIG. 1. The rollable display device 560 may be implemented as an organic light emitting display (OLED) device, a liquid crystal display (LCD) device, etc. In addition, the electronic device 500 may further include a plurality of ports for communicating with a video card, a sound card, a memory card, a universal serial bus (USB) device, other electronic devices, etc. In an exemplary embodiment, as illustrated in FIG. 12, the electronic device 500 may be implemented as a flexible smart phone. However, the electronic device 500 is not limited thereto. For example, the electronic device 500 may be implemented as a cellular phone, a video phone, a smart pad, a smart watch, a tablet PC, a car navigation system, a television, a computer monitor, a laptop, a head mounted display (HMD) device, etc.

The processor 510 may perform various computing functions. The processor 510 may control a displaying operation of the rollable display device 560 based on a rolling detection signal indicating whether the rollable display device 560 is rolled or unrolled when the rolling detection sensor 550 outputs the rolling detection signal. For example, the processor 510 may control the rollable display device 560 to display images only on an unrolled region (i.e., a display region) of a rollable display panel included in the rollable display device 560. The processor 510 may be a micro processor, a central processing unit (CPU), an application processor (AP), etc. The processor 510 may be coupled to other components via an address bus, a control bus, a data bus, etc. Further, the processor 510 may be coupled to an extended bus such as a peripheral component interconnection (PCI) bus. The memory device 520 may store data for operations of the electronic device 500. For example, the memory device 520 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device, such as a dynamic random access memory (DRAM) device, a static random access memory (SRAM) device, a mobile DRAM device, etc. The storage device 530 may include a solid state drive (SSD) device, a hard disk drive (HDD) device, a CD-ROM device, etc. The I/O device 540 may include an input device such as a keyboard, a keypad, a mouse device, a touchpad, a touch-screen, etc., and an output device such as a printer, a speaker, etc. In an exemplary embodiment, the electronic device 500 may further include a power supply that provides power for operations of the electronic device 500.

The rolling detection sensor 550 may generate the rolling detection signal indicating whether the rollable display device 560 is rolled or unrolled, and provide the rolling detection signal to the processor 510. Thus, the rollable display device 560 may selectively perform a displaying operation that corresponds to the degree that the rollable display panel is unrolled. For example, the rollable display device 560 may display images on the unrolled region (e.g., the display region) of the rollable display panel and may not display the images on a rolled region (e.g., a non-display region) of the rollable display panel. That is, the rollable display device 560 may display images having different sizes according to the degree that the rollable display panel is unrolled. The rollable display device 560 may be coupled to other components via the buses or other communication links. In an exemplary embodiment, the rollable display device 560 may be included in the I/O device 540.

As described above, the rollable display device 560 may change an ohmic drop compensation margin of a low power voltage ELVSS for compensating for ohmic drops based on the degree that the rollable display panel is unrolled. As such, the rollable display device 560 may include the rollable display panel, a panel driving circuit, a power supplying circuit, and an ohmic drop compensation margin changing circuit. The rollable display panel may include a plurality of pixels each including an organic light emitting element. The panel driving circuit may drive the rollable display panel. The power supplying circuit may provide a high power voltage ELVDD and the low power voltage ELVSS to the rollable display panel, where the organic light emitting element emits light based on the high power voltage ELVDD and the low power voltage ELVSS.

The ohmic drop compensation margin changing circuit may sense the degree that the rollable display panel is unrolled, and may change the ohmic drop compensation margin of the low power voltage ELVSS based on the degree that the rollable display panel is unrolled. The ohmic drop compensation margin changing circuit may increase the ohmic drop compensation margin of the low power voltage ELVSS as the degree of the rollable display panel is unrolled increases (e.g., as an area of the display region of the rollable display panel increases) and may decrease the ohmic drop compensation margin of the low power voltage ELVSS as the degree of the rollable display panel is unrolled decreases (e.g., as the area of the display region of the rollable display panel decreases). In exemplary embodiments, the ohmic drop compensation margin changing circuit may determine the ohmic drop compensation margin of the low power voltage ELVSS based on predetermined mapping information between the degree that the rollable display panel is unrolled and the ohmic drop compensation margin of the low power voltage ELVSS. In exemplary embodiments, the ohmic drop compensation margin changing circuit may adjust the ohmic drop compensation margin of the low power voltage ELVSS based on grayscale information indicating grayscales of image data corresponding to an image to be displayed on the rollable display panel and/or actually measured ohmic drop information indicating actually measured ohmic drops of the display region of the rollable display panel. As detailed descriptions of the above processes are described above, repeated description thereof will be omitted.

According to exemplary embodiments, the rollable display device 560 may provide a sufficient ohmic drop compensation margin when the area of the display region of the rollable display panel is relatively large (e.g., when the rollable display panel is unrolled to the greater degree) and may prevent unnecessary power consumption when the area of the display region of the rollable display panel is relatively small (e.g., when the rollable display panel is unrolled to the lesser degree). As such, the electronic device 500 including the rollable display device 560 may achieve optimized power consumption as well as portability, usability, good design, etc.

The exemplary embodiments may be applied to a rollable display device and an electronic device including the rollable display device. For example, the exemplary embodiments may be applied to a cellular phone, a smart phone, a video phone, a smart pad, a smart watch, a tablet PC, a car navigation system, a television, a computer monitor, a laptop, a head mounted display device, etc.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A rollable display device comprising:
a rollable display panel comprising a plurality of pixels each comprising an organic light emitting element;
a panel driving circuit configured to drive the rollable display panel;
a power supplying circuit configured to supply a high power voltage and a low power voltage to the rollable display panel, such that the organic light emitting element emits light based on the high power voltage and the low power voltage; and
an ohmic drop compensation margin changing circuit configured to sense a degree that the rollable display panel is unrolled and change an ohmic drop compensation margin of the low power voltage to compensate ohmic drops based on the degree that the rollable display panel is unrolled.

2. The rollable display device of claim 1, wherein the ohmic drop compensation margin changing circuit is configured to:
increase the ohmic drop compensation margin of the low power voltage as the degree that the rollable display panel is unrolled increases; and
decrease the ohmic drop compensation margin of the low power voltage as the degree that the rollable display panel is unrolled decreases.

3. The rollable display device of claim 2, wherein the ohmic drop compensation margin changing circuit is configured to continuously increase or decrease the ohmic drop compensation margin of the low power voltage as the degree that the rollable display panel is unrolled increases or decreases.

4. The rollable display device of claim 2, wherein the ohmic drop compensation margin changing circuit is configured to discretely increase or decrease the ohmic drop compensation margin of the low power voltage as the degree that the rollable display panel is unrolled increases or decreases.

5. The rollable display device of claim 2, wherein the power supplying circuit is configured to provide a maximum voltage of the ohmic drop compensation margin of the low power voltage as the low power voltage to a first region of a display region of the rollable display panel having the smaller ohmic drop.

6. The rollable display device of claim 5, wherein the maximum voltage of the ohmic drop compensation margin of the low power voltage is constant regardless of the degree that the rollable display panel is unrolled.

7. The rollable display device of claim 5, wherein the power supplying circuit is configured to provide a minimum voltage of the ohmic drop compensation margin of the low power voltage as the low power voltage to a second region of the display region having the largest ohmic drop.

8. The rollable display device of claim 7, wherein:
the minimum voltage of the ohmic drop compensation margin of the low power voltage decreases as the degree that the rollable display panel is unrolled increases; and
the minimum voltage of the ohmic drop compensation margin of the low power voltage increases as the degree that the rollable display panel is unrolled decreases.

9. The rollable display device of claim 2, wherein the ohmic drop compensation margin changing circuit is configured to determine the ohmic drop compensation margin of the low power voltage based on predetermined mapping information between the degree that the rollable display panel is unrolled and the ohmic drop compensation margin of the low power voltage.

10. The rollable display device of claim 9, wherein the ohmic drop compensation margin changing circuit is configured to adjust the ohmic drop compensation margin of the low power voltage based on gray-scale information indicating gray-scales of image data that corresponds to an image to be displayed on the rollable display panel.

11. The rollable display device of claim 9, wherein the ohmic drop compensation margin changing circuit is configured to adjust the ohmic drop compensation margin of the low power voltage based on ohmic drop information comprising measured ohmic drops of a display region of the rollable display panel.

12. The rollable display device of claim 9, wherein the ohmic drop compensation margin changing circuit is configured to adjust the ohmic drop compensation margin of the low power voltage based on:
gray-scale information indicating gray-scales of image data that corresponds to an image to be displayed on the rollable display panel; and
ohmic drop information comprising measured ohmic drops of a display region of the rollable display panel.

13. An electronic device comprising:
a rollable display device;

a rolling detection sensor configured to generate a rolling detection signal indicating whether the rollable display device is rolled or unrolled; and a processor configured to control a displaying operation of the rollable display device based on the rolling detection signal, wherein the rollable display device comprises:

a rollable display panel comprising a plurality of pixels each comprising an organic light emitting element;

a panel driving circuit configured to drive the rollable display panel;

a power supplying circuit configured to supply a high power voltage and a low power voltage to the rollable display panel, such that the organic light emitting element emits light based on the high power voltage and the low power voltage; and an ohmic drop compensation margin changing circuit configured to sense a degree that the rollable display panel is unrolled and change an ohmic drop compensation margin of the low power voltage to compensate ohmic drops based on the degree that the rollable display panel is unrolled.

14. The electronic device of claim 13, wherein the ohmic drop compensation margin changing circuit is configured to:

increase the ohmic drop compensation margin of the low power voltage as the degree that the rollable display panel is unrolled increases; and decrease the ohmic drop compensation margin of the low power voltage as the degree that the rollable display panel is unrolled decreases.

15. The electronic device of claim 14, wherein the ohmic drop compensation margin changing circuit is configured to continuously increase or decrease the ohmic drop compensation margin of the low power voltage as the degree that the rollable display panel is unrolled increases or decreases.

16. The electronic device of claim 14, wherein the ohmic drop compensation margin changing circuit is configured to discretely increase or decrease the ohmic drop compensation margin of the low power voltage as the degree that the rollable display panel is unrolled increases or decreases.

17. The electronic device of claim 14, wherein the power supplying circuit is configured to provide a maximum voltage of the ohmic drop compensation margin of the low power voltage as the low power voltage to a first region of a display region of the rollable display panel having the smallest ohmic drop.

18. The electronic device of claim 17, wherein the maximum voltage of the ohmic drop compensation margin of the low power voltage is constant regardless of the degree that the rollable display panel is unrolled.

19. The electronic device of claim 17, wherein the power supplying circuit is configured to provide a minimum voltage of the ohmic drop compensation margin of the low power voltage as the low power voltage to a second region of the display region having the largest ohmic drop.

20. The electronic device of claim 19, wherein:

the minimum voltage of the ohmic drop compensation margin of the low power voltage is configured to decrease as the degree that the rollable display panel is unrolled increases; and the minimum voltage of the ohmic drop compensation margin of the low power voltage is configured to increase as the degree that the rollable display panel is unrolled decreases.

* * * * *